United States Patent
Chiao et al.

(10) Patent No.: US 10,029,816 B2
(45) Date of Patent: Jul. 24, 2018

(54) PRESSURE SENSITIVE LABELS FOR USE IN A COLD TRANSFER METHOD AND PROCESS FOR MAKING

(75) Inventors: Yi-Hung Chiao, Temple City, CA (US); Sharis Krekian, Glendale, CA (US); Christine Uyen Dang, Garden Grove, CA (US); Yuan Yuan Zhang, San Dimas, CA (US); Sriram Venkatasanthanam, Chino Hills, CA (US); Kai Li, Diamond Bar, CA (US); Ramin Heydarpour, Beverly Hills, CA (US)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 18 days.

(21) Appl. No.: 12/787,459

(22) Filed: May 26, 2010

(65) Prior Publication Data
US 2011/0289647 A1    Dec. 1, 2011

(51) Int. Cl.
*A41D 27/00* (2006.01)
*A41D 1/00* (2006.01)
(Continued)

(52) U.S. Cl.
CPC .............. *B65C 5/02* (2013.01); *B32B 5/022* (2013.01); *B32B 5/024* (2013.01); *B32B 5/18* (2013.01);
(Continued)

(58) Field of Classification Search
CPC ........... B44C 1/1733; B65C 5/02; B65C 5/00; D06M 17/00; D06M 17/06; D06P 5/003; D06Q 1/10; D06Q 1/12; G09F 3/0297; G09F 3/10; G09F 2003/0282; G09F 2003/0241; B32B 7/12; B32B 37/02; B32B 27/08; B32B 27/285; B32B 27/30;
(Continued)

(56) References Cited

U.S. PATENT DOCUMENTS 3,131,106 A * 4/1964 Mackenzie ................. 156/230
3,314,838 A    4/1967 Erwin
(Continued)

FOREIGN PATENT DOCUMENTS

AU    6960596    3/1997
AU    732752 A    3/1999
(Continued)

OTHER PUBLICATIONS

International Search Report dated Apr. 5, 2012 for International Application No. PCT/US2011/037827 filed May 25, 2011.
(Continued)

*Primary Examiner* — Patricia L. Nordmeyer
(74) *Attorney, Agent, or Firm* — Avery Dennison Retail Information Services, LLC

(57) ABSTRACT

The present invention relates to a pressure sensitive label for use in a cold transfer process that can be used for garment identification and labeling. The pressure sensitive label can be applied on textile surface or any other surfaces for which heat transfer is unfavorable or unavailable. The pressure sensitive label can remain on the substrate to which it is attached through repeated washing and drying cycles.

9 Claims, 5 Drawing Sheets

(51) Int. Cl.

| | | |
|---|---|---|
| *B05D 1/36* | (2006.01) | |
| *B05D 5/00* | (2006.01) | |
| *B05D 5/10* | (2006.01) | |
| *B32B 33/00* | (2006.01) | |
| *B32B 37/02* | (2006.01) | |
| *B32B 37/12* | (2006.01) | |
| *B32B 37/14* | (2006.01) | |
| *B32B 38/04* | (2006.01) | |
| *B32B 7/12* | (2006.01) | |
| *B65C 5/02* | (2006.01) | |
| *B32B 9/04* | (2006.01) | |
| *B32B 15/08* | (2006.01) | |
| *B32B 15/20* | (2006.01) | |
| *B32B 27/08* | (2006.01) | |
| *B32B 27/28* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B44C 1/17* | (2006.01) | |
| *D06M 17/00* | (2006.01) | |
| *D06M 17/06* | (2006.01) | |
| *D06P 5/24* | (2006.01) | |
| *D06Q 1/10* | (2006.01) | |
| *D06Q 1/12* | (2006.01) | |
| *G09F 3/00* | (2006.01) | |
| *G09F 3/10* | (2006.01) | |
| *B32B 5/02* | (2006.01) | |
| *B32B 5/18* | (2006.01) | |
| *B32B 7/06* | (2006.01) | |
| *B32B 9/02* | (2006.01) | |
| *B32B 27/40* | (2006.01) | |
| *B32B 29/06* | (2006.01) | |
| *B32B 38/00* | (2006.01) | |
| *G09F 3/02* | (2006.01) | |

(52) U.S. Cl.
CPC .................. *B32B 7/06* (2013.01); *B32B 7/12* (2013.01); *B32B 9/02* (2013.01); *B32B 9/025* (2013.01); *B32B 9/04* (2013.01); *B32B 15/08* (2013.01); *B32B 15/20* (2013.01); *B32B 27/08* (2013.01); *B32B 27/285* (2013.01); *B32B 27/30* (2013.01); *B32B 27/304* (2013.01); *B32B 27/32* (2013.01); *B32B 27/34* (2013.01); *B32B 27/36* (2013.01); *B32B 27/40* (2013.01); *B32B 29/06* (2013.01); *B32B 37/02* (2013.01); *B44C 1/1733* (2013.01); *D06M 17/00* (2013.01); *D06M 17/06* (2013.01); *D06P 5/003* (2013.01); *D06Q 1/10* (2013.01); *D06Q 1/12* (2013.01); *G09F 3/0297* (2013.01); *G09F 3/10* (2013.01); *B32B 38/0004* (2013.01); *B32B 38/145* (2013.01); *B32B 2255/12* (2013.01); *B32B 2255/26* (2013.01); *B32B 2307/406* (2013.01); *B32B 2307/538* (2013.01); *B32B 2307/546* (2013.01); *B32B 2307/7163* (2013.01); *B32B 2307/732* (2013.01); *B32B 2307/75* (2013.01); *B32B 2310/0831* (2013.01); *B32B 2437/00* (2013.01); *B32B 2439/80* (2013.01); *B32B 2519/00* (2013.01); *B32B 2519/02* (2013.01); *G09F 2003/0241* (2013.01); *G09F 2003/0282* (2013.01); *Y10T 156/10* (2015.01); *Y10T 156/1052* (2015.01); *Y10T 428/24802* (2015.01); *Y10T 428/28* (2015.01)

(58) Field of Classification Search
CPC ......... B32B 27/32; B32B 27/34; B32B 27/36; B32B 2310/0831; B32B 2437/00; B32B 2519/00
USPC .................................................. 428/40.1, 343
See application file for complete search history.

(56) References Cited

U.S. PATENT DOCUMENTS

| | | | |
|---|---|---|---|
| 4,352,359 A | 10/1982 | Larimore et al. | |
| 4,418,120 A | 11/1983 | Kealy et al. | |
| 4,421,816 A * | 12/1983 | Arnold | 428/202 |
| 4,554,324 A | 11/1985 | Husman et al. | |
| 4,576,854 A * | 3/1986 | Kurahashi | 428/204 |
| 4,605,461 A | 8/1986 | Ogi | |
| 4,762,888 A | 8/1988 | Sun et al. | |
| 4,880,678 A | 11/1989 | Goffi | |
| 4,923,913 A | 5/1990 | Chich et al. | |
| 4,942,201 A | 7/1990 | Briggs et al. | |
| 5,009,943 A | 4/1991 | Stahl | |
| 5,049,608 A | 9/1991 | Medina | |
| 5,112,691 A | 5/1992 | Briggs | |
| 5,141,790 A | 8/1992 | Calhoun et al. | |
| 5,221,706 A | 6/1993 | Lee et al. | |
| 5,225,470 A | 7/1993 | Mancinelli | |
| 5,296,277 A | 3/1994 | Wilson et al. | |
| 5,349,004 A | 9/1994 | Kumar et al. | |
| 5,373,041 A | 12/1994 | Prejean | |
| 5,380,779 A | 1/1995 | D'Haese | |
| 5,489,624 A | 2/1996 | Kantner | |
| 5,599,601 A | 2/1997 | Polski et al. | |
| 5,621,020 A | 4/1997 | Khatib et al. | |
| 5,635,001 A | 6/1997 | Mahn, Jr. et al. | |
| 5,648,425 A | 7/1997 | Everaerts et al. | |
| 5,651,852 A | 7/1997 | Mitchell | |
| 5,688,635 A | 11/1997 | Parker | |
| 5,736,290 A | 4/1998 | Zillmer | |
| 5,737,678 A | 4/1998 | Volkers | |
| 5,762,377 A | 6/1998 | Chamberlain et al. | |
| 5,800,919 A | 9/1998 | Peacock et al. | |
| 5,874,143 A | 2/1999 | Peloquin et al. | |
| 5,907,740 A | 5/1999 | Nozawa | |
| 5,990,229 A | 11/1999 | Hille et al. | |
| 6,153,038 A | 11/2000 | Brooker | |
| 6,191,382 B1 | 2/2001 | Damikolas | |
| 6,277,229 B1 | 8/2001 | Popat | |
| 6,299,719 B1 | 10/2001 | Traband | |
| 6,352,768 B1 | 3/2002 | Hseih et al. | |
| 6,358,660 B1 | 3/2002 | Agler | |
| 6,368,687 B1 * | 4/2002 | Joseph et al. | 428/40.1 |
| 6,410,200 B1 | 6/2002 | Williams | |
| 6,506,445 B2 | 1/2003 | Popat | |
| 6,582,791 B2 | 6/2003 | Peloquin et al. | |
| 6,656,306 B1 | 12/2003 | Mabbott | |
| 6,683,026 B2 | 1/2004 | Storfer-Isser | |
| 6,689,429 B2 | 2/2004 | Simons | |
| 6,723,773 B2 | 4/2004 | Williams | |
| 6,753,050 B1 | 6/2004 | Dalvey et al. | |
| 6,824,839 B1 | 11/2004 | Popat | |
| 6,878,440 B1 * | 4/2005 | Yamanaka et al. | 428/345 |
| 6,884,837 B2 | 4/2005 | Kohlhammer | |
| 6,951,671 B2 | 10/2005 | Mukherjee et al. | |
| 6,974,609 B2 | 12/2005 | Engle | |
| 7,008,746 B2 | 3/2006 | Williams | |
| 7,081,324 B1 | 7/2006 | Hare | |
| 7,095,324 B2 | 8/2006 | Conwell et al. | |
| 7,109,288 B2 | 9/2006 | Akatsuka et al. | |
| 7,403,720 B2 | 7/2008 | Nomura | |
| 7,462,390 B2 | 12/2008 | Kim | |
| 7,652,103 B2 | 1/2010 | Kavanagh | |
| 7,714,076 B2 | 5/2010 | Krepski | |
| 8,148,471 B2 | 4/2012 | Kavanagh | |
| 8,263,711 B2 | 9/2012 | Krepski | |
| 2001/0031342 A1 | 10/2001 | Engle | |
| 2002/0029843 A1 | 3/2002 | Popat | |
| 2002/0058194 A1 | 5/2002 | Williams | |

(56) References Cited

U.S. PATENT DOCUMENTS

| | | |
|---|---|---|
| 2002/0081442 A1 | 6/2002 | Simons |
| 2003/0023018 A1 | 1/2003 | Nakano et al. |
| 2003/0161974 A1 | 8/2003 | Storfer-Isser |
| 2003/0168156 A1 | 9/2003 | Engle |
| 2003/0170429 A1 | 9/2003 | Engle |
| 2004/0059038 A1 | 3/2004 | Williams |
| 2004/0147709 A1 | 7/2004 | Akatsuka |
| 2006/0021270 A1 | 2/2006 | Hanley |
| 2006/0146378 A1 | 7/2006 | Nomura |
| 2007/0149715 A1 | 6/2007 | Lee |
| 2007/0218227 A1* | 9/2007 | Nishizawa ........ B29C 45/14836 428/35.7 |
| 2009/0025123 A1 | 1/2009 | Weedlun et al. |
| 2009/0223622 A1 | 9/2009 | Llano |
| 2010/0021670 A1 | 1/2010 | Llano |
| 2010/0227969 A1 | 9/2010 | Zhu |
| 2010/0297368 A1 | 11/2010 | Park |
| 2011/0032455 A1 | 2/2011 | Kim |
| 2011/0054115 A1 | 3/2011 | Erdogan |
| 2011/0122343 A1 | 5/2011 | Park |
| 2011/0124797 A1 | 5/2011 | Kavanagh |
| 2011/0152445 A1 | 6/2011 | Krepski |
| 2011/0168319 A1 | 7/2011 | Baqai et al. |
| 2011/0236605 A1 | 9/2011 | Hattori |
| 2012/0121897 A1 | 5/2012 | Kim |

FOREIGN PATENT DOCUMENTS

| | | |
|---|---|---|
| AU | 9316398 | 3/1999 |
| AU | 3785199 | 11/1999 |
| AU | 744710 B | 2/2000 |
| AU | 720438 B2 | 6/2000 |
| AU | 4475700 | 11/2000 |
| AU | 7839000 A | 4/2001 |
| AU | 4905601 A | 8/2001 |
| AU | 4047400 | 10/2002 |
| BR | 9610439 A | 7/1999 |
| BR | 9811451 A | 8/2000 |
| CN | 1188916 A | 7/1998 |
| CN | 1200085 A | 11/1998 |
| CN | 1269751 A | 10/2000 |
| CN | 200510026661 | 7/2006 |
| CN | 200520044827 | 10/2006 |
| CN | 200520044826 | 12/2006 |
| DE | 69600198 A | 4/1998 |
| DE | 69804978 T2 | 8/2002 |
| DE | 69632867 T2 | 7/2004 |
| DE | 60017117D1 | 2/2005 |
| DE | 60102660 T2 | 3/2005 |
| DE | 60020688 A | 7/2005 |
| DE | 60113388 T2 | 6/2006 |
| DE | 69832732 T2 | 7/2006 |
| DE | 60324723 A | 1/2009 |
| EP | 0645439 | 4/1996 |
| EP | 0743557 A1 | 11/1996 |
| EP | 0831381 A2 | 3/1998 |
| EP | 0855962 A1 | 8/1998 |
| EP | 0921013 A1 | 6/1999 |
| EP | 1089687 | 4/2001 |
| EP | 1168282 | 1/2002 |
| EP | 1168282 A1 | 2/2002 |
| EP | 1011983 | 4/2002 |
| EP | 1219692 A2 | 7/2002 |
| EP | 1338432 A2 | 8/2003 |
| EP | 1177105 | 12/2004 |
| EP | 1171310 | 6/2005 |
| EP | 1263605 | 9/2005 |
| EP | 1127710 A1 | 12/2005 |
| EP | 1698946 A2 | 9/2006 |
| EP | 2267218 | 12/2010 |
| FR | 2771675 A1 | 6/1999 |
| GB | 1399922 | 7/1975 |
| IL | 134790 A | 9/2002 |
| JP | 1242676 | 9/1989 |
| JP | 4118691 | 4/1992 |
| JP | 4118691 A * | 4/1992 |
| JP | 5105856 | 4/1993 |
| JP | 1091009 A | 4/1998 |
| JP | H11511404 A | 10/1999 |
| JP | 2002302896 A | 10/2002 |
| JP | 2002541269 A | 12/2002 |
| JP | 2002542091 A | 12/2002 |
| JP | 3681831 B2 | 5/2005 |
| JP | 2005215708 A | 8/2005 |
| JP | 2001515808 A | 1/2006 |
| JP | 3803358 B2 | 5/2006 |
| JP | 2006171634 A | 6/2006 |
| JP | 2006171635 A | 6/2006 |
| JP | 2003522058 A | 7/2006 |
| JP | 4188592 B2 | 9/2008 |
| KR | 1999044152 A | 6/1999 |
| KR | 2001023897 A | 3/2001 |
| MX | 199801522 A1 | 10/1998 |
| MX | 2000010671 A1 | 4/2002 |
| MX | 214457 B | 5/2003 |
| NZ | 318194 A | 4/1999 |
| TW | 300204 A | 3/1997 |
| WO | 93/06182 | 4/1993 |
| WO | 93/06184 | 4/1993 |
| WO | WO-9707991 A1 | 3/1997 |
| WO | 97/31076 | 8/1997 |
| WO | WO-9912743 A1 | 3/1999 |
| WO | WO-9956682 A1 | 11/1999 |
| WO | WO-0064685 A1 | 11/2000 |
| WO | WO-0123664 A1 | 4/2001 |
| WO | WO-0158698 A1 | 8/2001 |
| WO | WO-0059733 A1 | 3/2002 |
| WO | 2007103168 | 3/2008 |
| WO | 2009040492 | 4/2009 |
| WO | WO-2009040492 A1 | 4/2009 |

OTHER PUBLICATIONS

Written Opinion dated Apr. 5, 2012 for International Application No. PCT/US2011/037827 filed May 25, 2011.

"Suzhou Baodelong Industrial Co., Ltd.", third-party corporate research website (Nov. 14, 2007), 4 pgs.

International Preliminary Report on Patentability dated Dec. 6, 2012 for International Application No. PCT/US2011/037827.

State Intellectual Property Office of PRC Notification of First Office Action dated Feb. 26, 2014.

State Intellectual Property Office of PRC Notification of Second Office Action dated Nov. 15, 2014.

Translation of Search Report dated Jul. 29, 2015 for ROC (Taiwan) Patent Application No. 100118508 filed May 26, 2011.

\* cited by examiner

PRESSURE SENSITIVE LABELS FOR USE IN A COLD TRANSFER METHOD AND PROCESS FOR MAKING

FIELD OF THE INVENTION

The present invention is in the field of pressure sensitive labels, and more particularly cold transfer process pressure sensitive labels for textile or other substrates. The pressure sensitive labels can be applied to a substrate and used in applications where a heat transfer label has been traditionally employed, but the present invention may accomplish the bonding with the substrate without the need of applying heat, a process referred as "cold transfer" throughout this disclosure. The pressure sensitive labels are durable and can remain on the substrate through repeated washing and drying cycles.

BACKGROUND OF THE INVENTION

Heat transfer labels have gained broad acceptance in the garment industry. Care labels, brand identifiers, graphical, numerical and other type of expressions used as decorations or for providing information for shirts, pants, sportswear, and personal identification labels are all examples of such current applications. Heat transfer labels typically use hot melt adhesives which become sticky at elevated temperature so as to enable application to the substrate, but after cooling can feel stiff or rough at ambient temperature. This stiffness or roughness of the label can make the wearer uncomfortable and in some instances can lead to skin irritation. Heat used to apply the label on the garment may also lead to an undesirable bond mark on the garment, that is a darkened or discolored area near where the label is applied. For labels using sublimation dyes, the heat may also cause dye migration through the label causing blurring or fading of the image. The heat may also damage a heat sensitive fabric material, such as synthetic fabric, which may partially melt if the heat is too high or applied for too long a period of time.

Heat transfer labels have also been used broadly in other identification or personalization products such as caps, binders, shoes, tote bags, toys, consumer electronics, sports gear, etc. that are found in schools, sport activities, camps, gyms, and other places. In addition to the issues associated with a heat transfer label described previously, the heating requirement for the transferring process limits the use of such labels to areas where a heat source is readily available. However, there is a larger desire to have transferrable images when there is no source of heat, and where instant personalized souvenirs or mementos can be created, such as an outdoor site of a sporting event, religious retreats, corporate outings, campsites, etc.

Heat used in the transfer process of traditional heat transfer labels may also limit the incorporation of other items into the label. For example, chemical or physical sensing devices, tracking devices, security or detection devices can be sensitive to the high heat used for the transfer process of heat transfer labels and can be damaged through exposure to heat and as such these items have generally not been incorporated as part of the transfer label for garments process.

Traditional pressure sensitive labels have been used in association with garments as name badges and size identification labels. These labels normally do not need to remain on a garment for long periods of time and therefore do not need to be particularly durable so as to withstand repeated washing and drying cycles that may be encountered with the garment. The pressure sensitive label will likely fall off the garment if the garment is subject to washing and drying. The concern for the wearer's comfort is also minimized due to the temporary nature of such applications.

Thus, there is a need for a new label that can be used in lieu of a heat transfer label for garments and other identification or personalization applications. There is a further need for a cold transfer process pressure sensitive label that can remain on a garment through repeated washing and drying cycles and provides softness and comfort to a wearer.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The invention is directed to a cold transfer process pressure sensitive label having similar or better properties to those of conventional heat transfer label offerings. The cold transfer process pressure sensitive label is suitable for use in connection with garment labeling, decoration, personalization, identification, and other purposes.

In one exemplary embodiment of the presently described invention, a pressure sensitive label includes an ink layer, a printable media layer, or both, with the ink layer on top of the printable media layer, and a pressure sensitive adhesive layer on the opposite side of the ink layer. The pressure sensitive adhesive has a wet adhesion to substrate greater than 10 N/in. The pressure sensitive label is capable of remaining on the substrate to which it is attached to through repeated washing and drying cycles.

In another exemplary embodiment of the presently described invention, a pressure sensitive label includes an ink layer and a pressure sensitive adhesive layer. The pressure sensitive adhesive is in registration with the ink layer and substantially juxtaposed thereon.

In another exemplary embodiment of the presently described invention, a labeled article includes a substrate and a pressure sensitive label. The pressure sensitive label includes an ink layer, or a printable media layer, or both, with the ink layer on top of the printable media layer, and a pressure sensitive adhesive layer on the opposite side of the ink layer. The pressure sensitive adhesive has a wet adhesion greater than 10 N/in. The pressure sensitive label is capable of remaining on the substrate to which it is attached to through repeated washing and drying cycles.

In a further exemplary embodiment of the presently described invention, a process of making a pressure sensitive label is described and includes the steps of first providing a temporary support and subsequently depositing an ink layer on the temporary support. Then depositing a pressure sensitive adhesive layer over the ink layer.

In a further exemplary embodiment of the presently described invention, a garment has a cold transfer pressure sensitive label attached to it. The pressure sensitive label includes an ink layer, or a printable media layer, or both, with the ink layer on top of the printable media layer, and a pressure sensitive adhesive layer on the opposite side of the ink layer. The pressure sensitive adhesive has a wet adhesion greater than 10 N/in. The pressure sensitive label is capable of remaining on the garment through repeated washing and drying cycles.

Other features and advantages of the present invention will become apparent to those skilled in the art from the following detailed description. It is to be understood; however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

Unless otherwise indicated, the illustrations in the above figures are not necessarily drawn to scale.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

The present invention relates to a cold transfer pressure sensitive label that can be used instead of heat transfer labels. The pressure sensitive label can be applied on textile surfaces, or any other surface for which heat treatment is unfavorable or unavailable. The pressure sensitive label can remain on the substrate to which it is attached through repeated washing and drying cycles. The pressure sensitive label of the present invention provides a soft, relatively smooth touch and feeling, which adds to the comfort of the wearer.

Throughout this disclosure, the term "layer" refers to the spacial arrangement of a specific type of material or functional components that can be either a continuous layer or a discontinuous layer, one provided in a pattern or uniform configuration or in a random or non-regular arrangement. One layer is "in registration" with another layer when they align correctly with each other according to the desired design or configuration.

Figure 1:
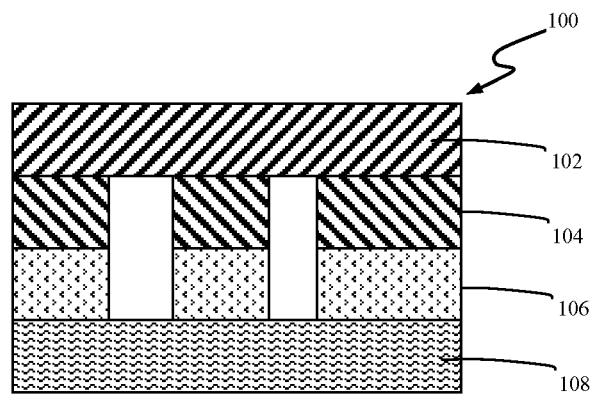
FIG. 1 is a sectional illustration of one exemplary embodiment of a pressure sensitive label according to the present invention.

Reference is now directed to FIG. 1, which provides a sectional view of an exemplary pressure sensitive label that may be applied in a cold transfer process and which is prepared in accordance with the presently described invention. The pressure sensitive label 100 has four layers: a layer of temporary support 102, a layer of indicia 104, a layer of pressure sensitive adhesive (PSA) 106 in registration with the indicia design, and a release liner 108 in contact with the layer of pressure sensitive adhesive to provide protection for the pressure sensitive adhesive. Upon application onto a substrate surface, the release liner 108 is peeled off first. The label is then attached onto the substrate surface through the PSA layer 106. Pressure can be applied with applicator's hand or pressure application tool, device, or equipment through the side of the temporary support. The temporary support 102 is then peeled off, leaving only the printed indicia 104 attached to the substrate surface through the PSA 106.

While one indicia layer 104 has been provided in FIG. 1, it should be understood that multiple layers of printed indicia may make up the indicia layer 104 and can be positioned between the temporary support layer 102 and the PSA layer 106. For example, a red ink layer can be deposited over a temporary support layer 102. Then, a white ink layer can be deposited over the red ink layer. A black ink layer can be further deposited over the white ink layer. All the ink layers may register with each other so that each layer aligns vertically on top of the other, or may not register with each other, that is the layers may be splayed out of arrangement depending on the attributes or requirements of the design. The indicia layer 104 can be created using dyes, colorants, pigments, or toners. The indicia can be printed or created using other patterning methods, such as screening, coating or the like.

In a further alternative arrangement instead of multiple layers of ink, printable media layers can also be used in place of one or more of the ink layers. A printable media layer can be made of a printable top-coating, a printable polymer film, or any other printable material that can be made as a layer. Throughout this disclosure, we use the term ink "association layer" to refer interchangeably to an ink layer or a printable media layer.

Figure 2:
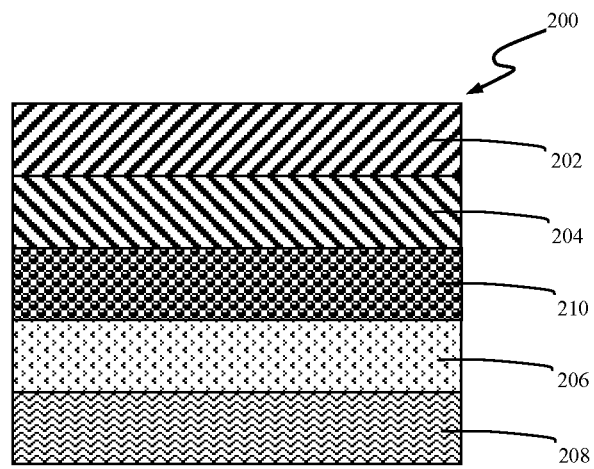
FIG. 2 is a sectional illustration of one exemplary embodiment of a pressure sensitive label according to the present invention.

FIG. 2 provides a sectional view of another exemplary pressure sensitive label which can be used in a cold transfer process that is prepared in accordance with the presently described invention. The pressure sensitive label 200 has five layers: a layer of temporary support 202, a layer of a first printed indicia 204, a layer of an ink association layer 210, a layer of pressure sensitive adhesive (PSA) 206, and a release liner 208 in contact with the layer of pressure sensitive adhesive. Upon application onto a substrate surface, the release liner 208 is peeled off first. The label is then attached onto the substrate surface through the PSA layer 206. Pressure can be applied with applicator's hand or other suitable pressure application device through the outermost side of the temporary support 202. The temporary support 202 is then peeled off and leaving only the printed indicia 204 and the ink association layer 210 attached to the substrate surface through the PSA 206.

Figure 3:
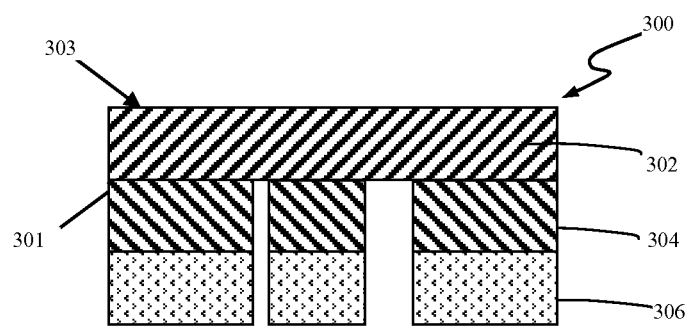
FIG. 3 is a sectional illustration of one exemplary embodiment of a pressure sensitive label according to the present invention.

FIG. 3 provides a sectional view of another exemplary pressure sensitive label 300 prepared in accordance with the presently described invention in a linerless or liner free configuration. The pressure sensitive label 300 has three layers: a layer of temporary support 302 with a first surface 301 and a second surface 303 with PSA release coating on the second surface 303, a layer of an indicia 304 in contact with the first surface 301 of the temporary support 302, a layer of pressure sensitive adhesive (PSA) 306 which is in registration with the printed indicia 304. In storage, the label is self wound so that the PSA is in contact with the PSA release coating on the second surface of the temporary carrier. Upon application onto a substrate surface (not shown), the PSA label is unrolled. The PSA label is then attached to the substrate surface with pressure applied through the exposed side or surface 303 of the temporary support 302. The temporary support layer 302 is then peeled off, and leaving only the printed indicia 304 attached to the substrate surface through the PSA 306.

Figure 4:
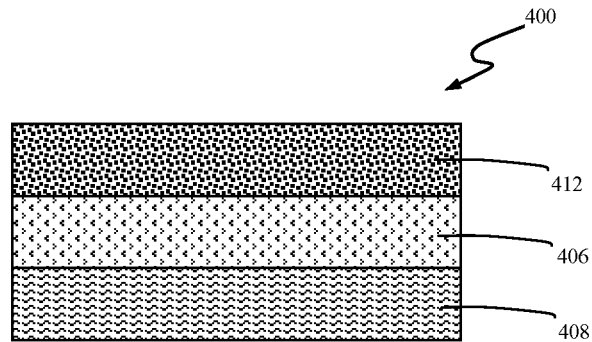
FIG. 4 is a sectional illustration of one exemplary embodiment of a pressure sensitive label according to the present invention.

FIG. 4 provides a sectional view of another exemplary pressure sensitive label prepared in accordance with the presently described invention. The pressure sensitive label 400 has three layers: a layer of a printable media 412, a layer of pressure sensitive adhesive (PSA) 406, and a release liner 408 in contact with the layer of pressure sensitive adhesive 406. The release liner 408 provides protection to the pressure sensitive adhesive. Optionally, the label 400 can be die-cut into the desired label shapes or configuration. Upon application onto a substrate surface, the release liner 408 is peeled off first. The label 400 is then attached onto the substrate surface through the PSA layer 406. Pressure can be applied through the side of the printable media 412. In a further exemplary embodiment of the invention, a PSA label 400 includes a release liner 408, a pressure sensitive adhesive layer 406, and a layer of indicia 412 over the PSA layer 406.

A PSA label in a further exemplary embodiment of the invention includes a layer of a printable media coated with printable release on one surface and a layer of PSA on opposite surface. In storage, a sheet with multiple PSA labels is self wound with the PSA in contact with the printable release of the printable media. U.S. Pat. Nos. 6,352,768 and 5,621,020 disclosed formulations of printable release. Publications, patents, and patent applications are referred to throughout this disclosure. All references cited herein are hereby incorporated by reference.

Optionally, the PSA label can be die cut into the desired shape. The die cut should be done so that each individual label can be easily torn off or separated from the label sheet or web, but each label is still attached to the label sheet before the application onto a substrate surface in disconnected spots. Upon application onto a substrate surface, the PSA label is unrolled first. The PSA label is then attached to the substrate surface with pressure applied through the side of the facestock.

Figure 8:
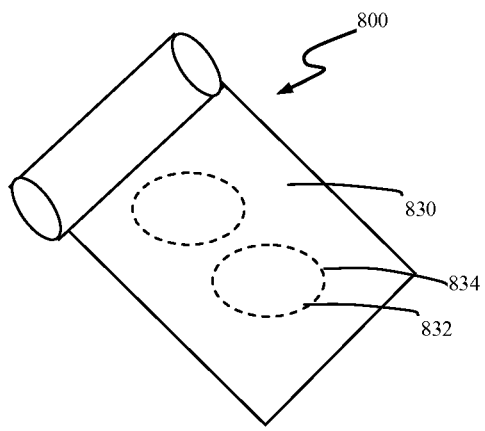
FIG. 8 illustrates an exemplary embodiment of a roll of pressure sensitive label according to the present invention.

FIG. 8 illustrates an exemplary roll of die-cut label according to the presently described invention. A self wound label sheet 800 has partially die cut labels 832 attached to the rest of the label sheet 830 through discontinued uncut portion 834.

Printed indicia can be created on the printable media before the label is attached onto the substrate surface, or after the label is attached onto the substrate surface. The indicia can be made through a digital printer such as a laser printer or an ink jet printer; an analog printer such as a screen printer or a flexo printer; a gravure printer; a writing instrument such as markers or pens; or any other printing methods. The inks can be liquid or solid. When created for a washable substrate, the indicia is, for example, made of components that are resistant to washing, i.e., which stay on the washable substrate through attachment to the pressure sensitive adhesive or the ink association layer. Examples of such inks include, without limitation, pigment inks formulated with wash durable polymeric binders such as polyurethane or polyacrylates; solid toners used in commercial laser printers such as laser toner from Oki C3200 printer; and dye-based inks used in printers such as HP or Epson printers. Examples of printers include, without limitation, analog printers, including industrial printing presses such as offset, Indigo, or Xeikon press; commercial inkjet and laser label printers, and office or home printers. Other additives, such as optical brightening agent, sparkling dusts, and indicators or taggants for anti-divergence or authentication or indicating purposes can also be added to the ink formulation.

The printed indicia should have good adhesion to the adhesive layer when contacting directly with the adhesive. For applications on a garment that is stretchable and flexible, elastomeric ink components in the ink formulations may be used. Examples of such components include, without limitation, polyurethane and polyacrylates. Commercially available polyurethanes include L2985 and HD2101 from C.L. Hauthaway & Sons Corporation in Lynn city, MA. MATSUMIN 301W from Matsui International Co. in Gardena, Calif. is an example of acrylic based screen printable ink. The ink can be further cross-linked to improve its washability. Suitable cross-linkers include, without limitation, APR 202 from Advanced Polymer inc., Carlstadt, N.J.; and CX-100 from NeoResins inc., Wilmington, Mass.

The layer of release liner provides protection to the PSA surface until the label is ready for use. Any release liner suitable for use with the chosen adhesive can be used. Release liners can be polyolefin film, coated paper or film, and coated super calendared paper, for example. Examples of coating materials suitable for release liners include, without limitation, silicone-based and fluorine-based materials, or any other material that has the desired releasing properties, for example, waxes, acrylates, and carbamates. The same type of coating materials can be used on the second surface of the temporary support in case of a self wound label. Examples of release coatings include, without limitation, SYL-OFF product lines from Dow Corning in Midland, Mich.; PRIMAL R and RHOPLEX R product lines from Dow Chemicals, Midland, Mich.; and DEHESIVE product lines from Wacker Polymer, Allentown, Pa. Examples of suitable release liners include, without limitation, D2 CL PET 7300A/7350A, Grade 27320, and LOPA- SIL from Loparex LLC, Willowbrook, Ill.; and PP coated casting liner from Felix Schoeller, Pulaski, N.Y.

The pressure sensitive adhesive needs to have sufficient adhesion to the substrate surface so that the label remains on the substrate surface through the normal use and wear of the substrate. For pressure sensitive labels for garment applications, the labels should stay on the garment through repeated washing and drying cycles. The pressure sensitive adhesive should be able to maintain sufficient adhesion to the garment fabric through the washing and drying process. Therefore, in addition to dry adhesion requirements, the present PSA adhesive should maintain wet tack and wet peel strength on the textiles or substrates to which it is applied. Exemplary textiles include, cotton, polycotton, silk, polyester, spandex, nylon and mixtures of them. The surface properties of such textiles or substrates range from highly hydrophilic to highly hydrophobic. Copolymerization of alkyl acrylate with acrylic acid copolymer and component blending of polar and non-polar polymer, resin, surfactant, cross-linker, and other additives have been discovered to ensure wash durability of the adhesive label. When the pressure sensitive label needs to be die-cut, good die pass through of the blade and separation from the surrounding material is also desired. When soaked with water, the adhesive should maintain a peel force of at least about 10 N/in measured with a modified peel test method. The test method will be explained in detail in the test method section. The adhesive is typically coated at about 50 microns to about 200 microns in thickness.

Examples of suitable pressure sensitive adhesives are tackified emulsion polymers, solvent-based polymers, or UV curable polymers. Examples of emulsion polymers include acrylic-based polymers, such as GELVA GME CYTEC 3011, 2397, and 2424 from Cytec Industries, Springfield, Mass.; KIWOPRINT D158, D148 from Kiwo Inc., Seabrook, Tex., AE 5108A, 3413, FT 1147, FT 1149 from Avery Dennison, Painesville, Ohio; and PROHESION 3100, 3200 from Rohm and Haas, Philadelphia, Pa. Examples of solvent-based polymers include I 814 and FT 1158 from Avery Dennison, Pasadena, Calif. Suitable tackifiers include hydrogenated rosin ester based, such as SE-E-720WF from Arakawa Chemical Industries, Ltd. in Osaka. Japan; SNOWTACK 765A and FORAL 85 from Hexion in LaVerge, Tenn.; and PENCEL D-125 from Eastman in Kingsport, Tenn. Tackifiers can be added from 5% to 50%. The pressure sensitive adhesive can be further plasticized. Examples of suitable plasticizers include, without limitation, CITROFLEX A4 and bibutyl sebacate, both from Vertellus Specialties, Indianapolis, Ind. Plasticizers can be added from 3% to 15%. The pressure sensitive adhesive can be further crosslinked. Examples of cross-linkers that can be used for such applications include, without limitation, APR 201, 202, 500 from Advanced Polymer inc., Carlstadt, N.J.; and CX-100 from NeoResins inc., Wilmington, Mass. Cross-linkers can be added from 0.5% to 20%. Emulsion-based polymers have the advantage of low volatile organic compound (VOC) and therefore are preferred in applications where environmentally friendly construction is preferred. Examples of UV-curable adhesives include, without limitation, GELVA GMR 8020-02 from Cytec Industries Inc. in Woodland Park, N.J.

The temporary support needs to have proper adhesion to the ink layer so that ink can be deposited on this support, and yet can be released from this support upon final application onto a substrate surface. We define the adhesion of the ink layer to the temporary support as F1, the adhesion of adhesive to a substrate surface as F2, the adhesion of the adhesive to the release liner as F3, and the adhesion of the ink to the adhesive as F4. The adhesion forces need to satisfy the following relationship:

$$F1<F2, F3<F1, \text{ and } F1<F4.$$

The adhesion forces F1 and F3 can be modified by treatment on the surface of the temporary support and the surface of the PSA release liner respectively. It has been discovered through this invention that the surface energy of the temporary support on the ink contacting side should be between about 20 to about 35 mN/m. A non-silicone based release coating in combination with a matte or textured substrate surface provides good balance of printability and releasing property. Examples of suitable temporary support include, without limitation, printable release coated substrate, such as acrylic-based coating, for example, R130W from Mayzo, Suwanne city, GA; and polypropylene coated sheet, such as HFM sheets from Avery NTP, Pasadena, Calif. The surface energy of the PSA release liner should be about 20 to about 25 mN/m. Silicone coated release typically has surface energy in the lower 20 mN/m range and therefore are good for PSA release, but too low for the temporary support. However, the silicone coated release can still be used as the temporary support with modification of the surface energy by methods known to one skilled in the art, such as corona treatment. Examples of silicone coated release include, D2 CL PET 7300A/7350A, Grade 27320 and 2SLKN and 5.0 MT PET 4400/4400 grade 26967 from Loparex in Iowa, Iowa.

Suitable printable media can be a film or a printable top coating. For garment applications, it is also desirable to use a soft and stretchable material as the printable media layer so that the label can stretch to the same extent as the fabric material. Suitable films include films made of polyurethane, polyethylene terephthalate (PET), ethylene vinyl acetate (EVA), fabric, synthetic leather, suede, foam, specialty paper, polypropylene, polyethylene, polyolefin, inkjet printable media, toner printable media, polyvinyl chloride (PVC), non-pvc film, biodegradable polymers, polylactic acid (PLA), bamboo textile, and other woven and nonwoven materials. Examples of such film materials include, without limitation, Avery printable Fabric from Avery Dennison, Pasadena, Calif.; VIENNA and ELITE, both are laser toner printable and writable synthetic leather from Fifield, Hingham, Mass.; DUREFLEX, an aromatic polyurethane from Deerfield, Bayer material science in South Deerfield, Mass.; HAUTHANE, HD 4664 and L 2985, polyurethane based emulsion, from Hauthaway and Sons Co located in Lynn, Mass.; Neenah paper 9754P0 from Neenah paper in Neenah Wis.; and EVA based MC912Q51 from Bloomer Plastics, Bloomer, Wis.; and WORTHEN PS603P from Worthen, Nashua, N.H.

Various topcoatings can be used as the printable media. U.S. patent application Ser. No. 12/619,652 disclosed such printable topcoating with a flexibility that can match that of a fabric. It is incorporated herein by reference in its entirety.

Other additives, such as pigment, humectant, cross-linking agent, and viscosity modifier can also be added into this printable media layer to improve its performance and processability. $TiO_2$ or hollow sphere polymer suspension, for example, can be added to improve the whiteness of the printable media. The printable media layer can be from about 10 microns to about 500 microns thick.

The label can be created using any process suitable for making such a label. When image-only transfer is needed, i.e., only the imaged area is desired to be left on the substrate, indicia patterning and registration with the adhesive is one important aspect to allow only the imaged area to be applied on textile or target surface. Layer registration between indicia and adhesive can be made by analog or digital cutting or printing, mechanical or optical assisted registration during printing, or utilizing novel process via stencil contact printing, fluid doming, pressure jetting, valving, nozzling, paste dispensing, digital non-contact printing, valve jetting, ultrasonic jetting, ink jetting, powder sprinkling or dry film transfer process. The material components which allow for analog and digital patterning and registration include the indicia forming material as well as the adhesive material, for example, toner or inks that allow for analog or digital printing, and liquid PSA that allows for analog printing or digital dispensing. When using a conventional process for PSA patterning or converting where the tackiness of the PSA can be an issue, the process can be facilitated through using capping or encapsulation techniques. For example, a high softening point tackifier can be utilized to cap or encapsulate the PSA to make the PSA surface non-tacky. This non-tacky surface allows for easier handling, additional printing, direct stacking, self-winding on the PSA or contact with other layers during patterning or converting, and capable of being homogenized with the underlying PSA layers by further heating or other suitable activation means. Other possible PSA activation mechanisms include UV or e-beam pattern curing, chemical reaction activation, or core/shell composite PSA, etc.

Figure 5:
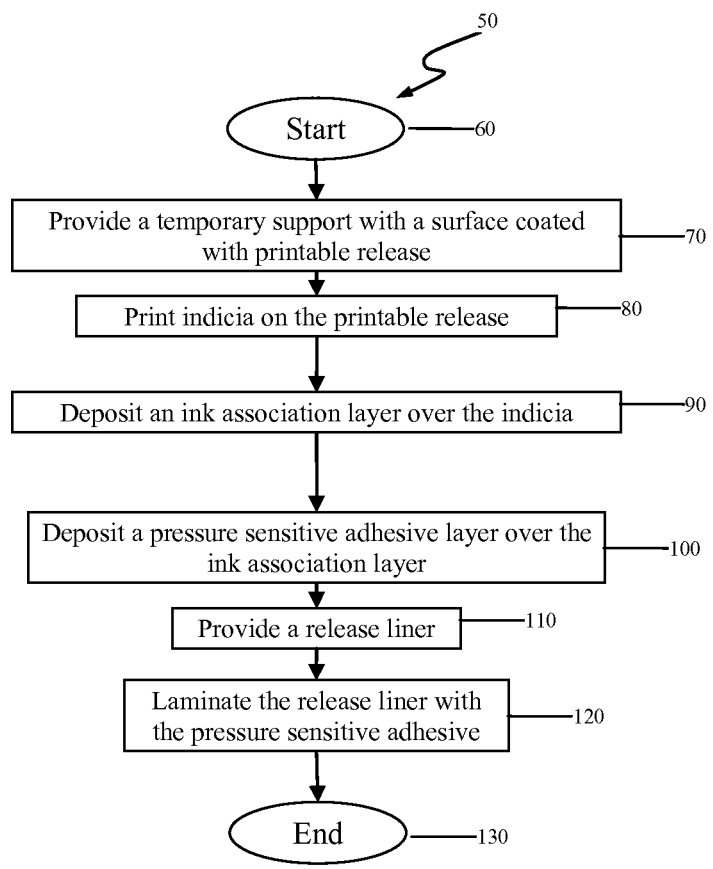
FIG. 5 is a block diagram illustrating an exemplary manufacturing process for making one embodiment of the pressure sensitive label according to the present invention.

An exemplary method of making a label according to the present invention is illustrated in the block diagram 50 of FIG. 5. After starting the process at step 60, the next step 70 is to provide a temporary support with a surface coated with printable release. Next, at step 80, indicia are made on the printable release using printing equipment. Such printing equipment can include for example a digital printer such as ink jet printer or laser printer; and analog printer such as screen printer or flexo printer. Non-limiting examples of printers include, Oki C3200 n laser toner printer, Epson inkjet printer, screen printing printers include ATMA and SAKURAI press. Besides the standard mesh screen stencil printing, which uses a screen support, the printing can also be carried out with metal stencil printing which does not use mesh screen. A typical thickness of the ink layer is around about 1 micron to about 20 microns. Next, at step 90, an ink association layer is provided over the indicia. The ink association layer can be another layer of ink, or a printable media. This ink association layer can be deposited using the same printing method as the ink layer, or it can be coated over the ink layer using a coating die. A typical thickness of the ink association layer is between about 5 microns to about 50 microns. Alternatively, the ink association layer may need to be dried in an oven or through other suitable drying methods. At step 100, an adhesive layer is disposed over the ink association layer and is dried. The adhesive layer can be coated over the ink association layer through methods such as die coating, extrusion, screen printing or digital dispense, such as through an inkjet printer, or automated nozzle dispensing such as through Asymtek Jet or I & J Fisnar Jet. Alternatively, additional layers of the adhesive may be printed over the first adhesive layer to build the thickness of this layer. The thickness of the adhesive layer is between about 20 microns to about 130 microns. The adhesive can be single layered, or multi-layered, or deposited with a pattern. At step 110, a release liner is provided. At step 120, the release liner is laminated with the temporary support through the adhesive. The method ends at step 130. Alternatively, the laminate may go through a die cutting station to cut labels to the desired shape and size. The cutting die cuts through the temporary support layer, and all the way to the surface of the release liner without cutting through the release liner. The die can be a shaped blade, a rotary cutting die, or a laser cutter. U.S. Pat. No. 6,191,382 discloses using laser to cut a substrate and it's incorporated herein by reference in its entirety. Upon application onto a substrate surface, the release liner is first peeled off. The label is then attached onto the substrate surface through the pressure sensitive adhesive. Alternatively, light pressure can be applied on the label through the temporary support surface. The temporary support layer is then peeled off. Only the ink, ink association layer and the pressure sensitive adhesive are left on the final substrate surface. The label sticks to the substrate well after the application process described here. Yet the wet adhesion onto fabrics often builds-up over time, and it is recommended to condition the label for 12 hours before subjecting the labeled substrate to washing and drying.

Figure 6:
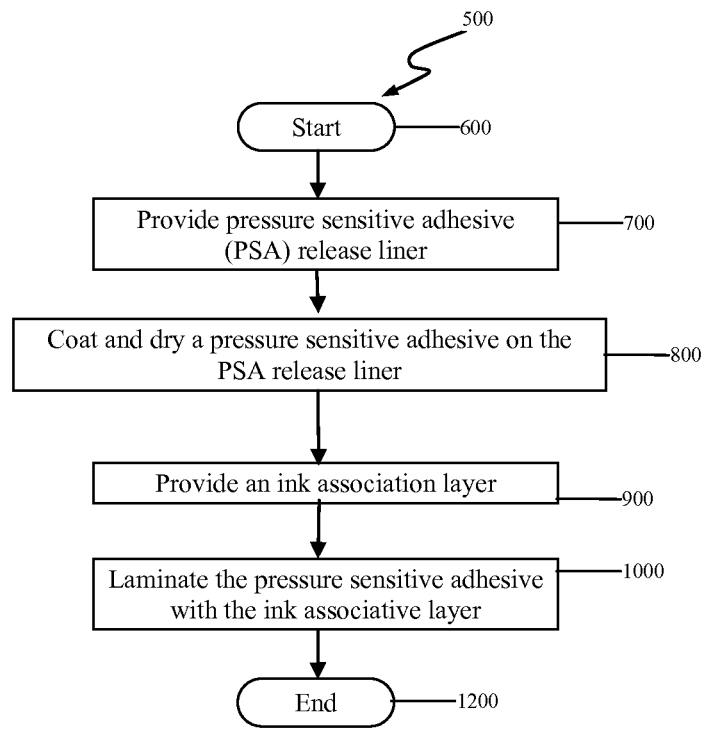
FIG. 6 is a block diagram illustrating an exemplary manufacturing process for making one embodiment of the pressure sensitive label according to the present invention.

In another embodiment of the invention, the label can be created according to the process illustrated in Flowchart 500 in FIG. 6. After starting at step 600, the next step 700 is to provide a PSA release liner. Next, at step 800, the pressure sensitive adhesive is coated on the release liner and dried. Next, at step 900, an ink association layer is provided. At step 1000, the ink association layer is laminated with the adhesive coated release liner through the adhesive layer. Alternatively, the laminate may go through a die cutting station to cut labels into desired shape and size. The cutting die cuts through the ink association layer, and all the way to the surface of the release liner without cutting through the release liner. Alternatively, the label may go through a printing station to have the indicia printed on the ink association layer. The method ends at step 1200.

Figure 9:
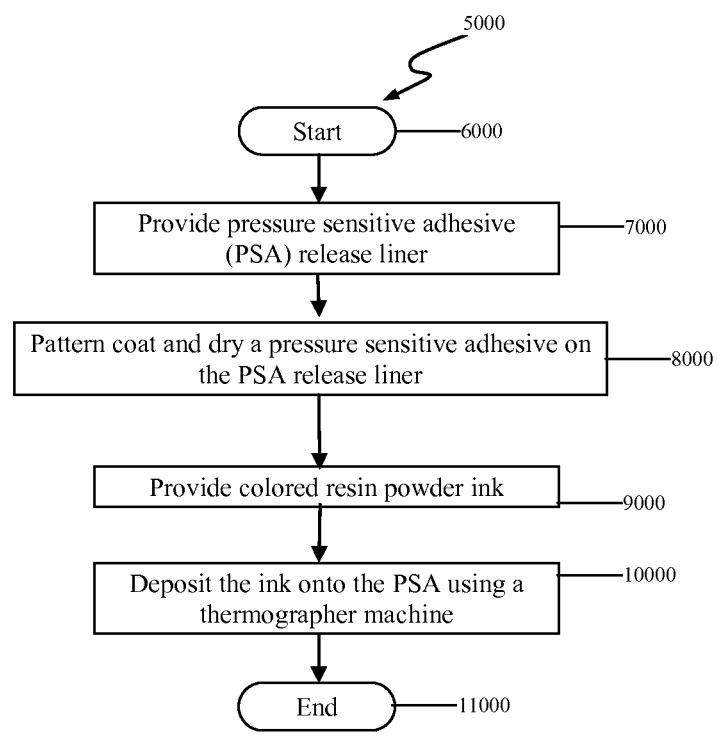
FIG. 9 is a block diagram illustrating an exemplary manufacturing process for making one embodiment of the pressure sensitive label according to the present invention.

In a further embodiment of the invention, the label can be created using the process as illustrated in Flowchart 5000 in FIG. 9. After starting at step 6000, the next step 7000 is to provide a release liner. Next, at step 8000, the pressure sensitive adhesive is pattern coated on the release liner according to the design and dried. Next, at step 9000, an ink made of colored or non-colored resin powder is provided. Then at step 10000, the ink is deposited over the patterned PSA layer using thermograph machine such as SUNRAISE Thermographer. Precise registration between the adhesive and indicia can be achieved in this fashion. The method ends at step 11000.

In addition to the foregoing, the label can be further overcoated with a varnish or other material to provide a glossy appearance or improved washability. This step may occur during the label forming process, after printing, or even after the label has been attached onto a substrate surface.

Figure 7:
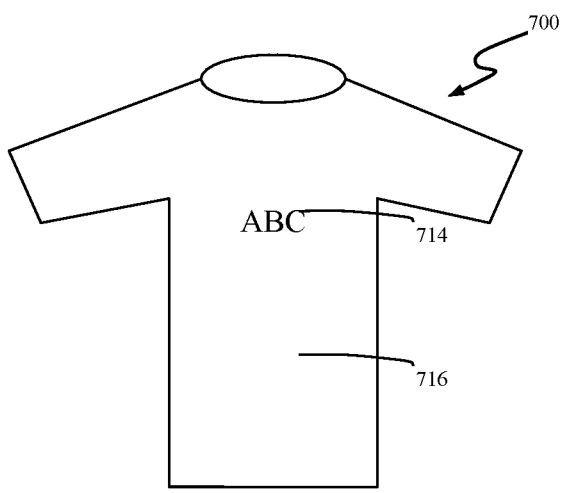
FIG. 7 illustrates the top view of an exemplary embodiment of a pressure sensitive label applied on a surface according to the present invention.

FIG. 7 illustrates the top view of an exemplary embodiment 700 of a PSA label applied to a T-shirt according to the present invention. The label bearing indicia 714 is posted on a T-shirt 716 through the use of an adhesive. In this exemplary embodiment, only the printed indicia 714 is attached to the T-shirt 716 through the use of the pressure sensitive adhesive. There is no frame of the label as most thermal transfer labels would have, to give a 'no-label' look.

The elimination of heat from the label application process further enables the incorporation of other functional items or devices into the label that may otherwise be sensitive to heat. Such items or devices include, without limitation, chemical or physical sensing devices, tracking devices, or detection devices. If applied by conventional heat transfer process, those items or devices could be damaged or not function properly due to the heat used in the application process of the transfer to the garment.

The pressure sensitive label of the current invention solves this problem. For example, a RFID tag can be attached to the target textile with the PSA in the transfer label; heat sensitive indicators or taggants, such as irreversible temperature change marker. Other functional components can also be encased in the PSA for product marking or identification purposes. Such components include, without limitation, barcodes, identification components, indication components, sensing components, marking components, tracking components, and authentication components. The PSA label can be further utilized to form a sandwiched structure, such as with a RFID inlay on an adhesive/liner carrier. Taggant, indicator, or sensor components such as irreversible thermochromic indicator can be similarly attached or sealed in with the current label construction at ambient temperature as part of the adhesive transfer label.

Figure 10:
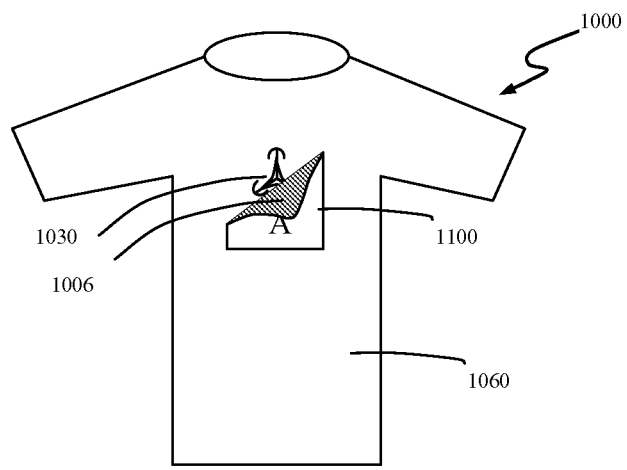
FIG. 10 illustrates the top view of an exemplary embodiment of a pressure sensitive label applied on a surface according to the present invention.

FIG. 10 illustrates an exemplary embodiment 1000 of a pressure sensitive label applied onto a garment with an RFID tag. The RFID tag 1030 is attached to the garment 1060 through the adhesive 1006 of the label 1100.

The label created with the current invention can also be used for other applications that need suitable wet adhesion. Such applications include fabric patches, uniform badges etc. In using as a fabric patch, a piece of fabric or other suitable carrier with the desired pattern printed on the surface is coated with pressure sensitive adhesive with the wet adhesion value greater than about 10 N/in. The patch can be used to patch up torn garments or to decorate the substrates it is applied on.

Without limitation, other additives, for example, surfactants, defoamers, dispersants, wetting agents, dyes, pigments, and co-solvents known to those skilled in the art can be added to the composition of each of the layers.

Test Methods

Wet Adhesion Test

The wet adhesion test measures the peel force required to remove the adhesive coated substrate from a test panel under wet condition using Instron 5542. A pressure sensitive adhesive is coated at 4 mils dry thickness on Mellinex 455-2 mil Mylar which is an uncoated PET carrier, and cut into 1" by 4" strips. The PSA is then applied on Atletico Home FA10—a red dyed 100% polyester fabric from Far Eastern Textile in Taiwan of 1" by 8" strips, with a 1" by 4" adhesive free end. The test strip is laminated on a stainless steel test panel from Cheminstruments through the PET side using a double side tape FT 530 from Avery Dennison with a 4" free end, the same region as the adhesive free end. One pass with a 2-kilogram rubber covered steel roller on the Cheminstruments Rolldown machine was used to laminate the strip to the test panel. The laminated test specimens are conditioned for 48 hours at room temperature. The test specimen is then saturated with DI water at room temperature for 5 minutes. The free end of the test strip is attached to the jaws of the Instron. The test is conducted at 90 degree angle. The peel rate is 12 inches per minute. Test was repeated with two sets prepared from the same material batch.

Dry Adhesion Test

The dry adhesion test measures the peel force required to remove the adhesive coated substrate from a test panel under dry condition using Instron 5542. The test method is similar to the wet adhesion test with elimination of the step where the test specimen is saturated with DI water at room temperature for 5 minutes. A pressure sensitive adhesive is coated at 4 mils dry thickness on Mellinex 455-2 mil Mylar, which is an uncoated PET carrier, and cut into 1" by 4" strips. The PSA is then applied on Atletico Home FA10-a red dyed 100% polyester fabric from Far Eastern Textile in Taiwan of 1" by 8" strips, with a 1" by 4" adhesive free end. The test strip is laminated on a stainless steel test panel from Cheminstruments through the PET side using a double side tape FT 530 from Avery Dennison with a 4" free end, the same region as the adhesive free end. One pass with a 2-kilogram rubber covered steel roller on the Cheminstruments Rolldown machine was used to laminate the strip to the test panel. The laminated test specimens are conditioned for 48 hours at room temperature. The free end of the test strip is attached to the jaws of the Instron. The test is conducted at 90 degree angle. The peel rate is 12 inch per minute. Test was repeated with two sets prepared from the same material batch.

Washing and Drying Test

Wash resistance of the label construction on textile or target substrates can be verified by American Association of Textile Chemists and Colorists (AATCC) test method 124. The laundry test uses a Maytac Atlantis washer and dryer. Warm water is about 105° F. and hot water is about 120° F. The test specimen is evaluated for any visible defects including edge lifting, wrinkling, cracking or color fading.

Rheology Dynamic Shear Test

The dynamic shear test was conducted using TA Instruments AR2000 with about 8 millimeters parallel plates. Temperature sweep from about −60° C. to about 200° C. was conducted with 10 rad/sec frequency and 3° C./sec heating rate.

Viscosity Test

The viscosity is measured using Brookfield viscometer with spindle 5 and under 10 rpm.

EXAMPLES

The chemicals used in the following examples are listed in Table 1 with information on the function, manufacturer and location of each.

TABLE 1

| Chemical | Function | Manufacturer | Location |
| --- | --- | --- | --- |
| 2SLKN | release liner | Mitsubishi Polyester Film Co. | Greer, SC |
| AE3413 | PSA | Avery Dennison | Pasadena, CA |
| APR 202 | crosslinker | Advanced Polymer Inc. | Carlstadt, NJ |
| AQUATAC6025 | Tackifier | Arizona Chemical | Jacksonville, FL |
| AQ white base | White ink base material | NTP | Gaupne, Norway |
| AQ cross-linker | Cross-linker | NTP | Gaupne, Norway |
| BORCHI GEL L75N | Thickener | Borchers GmbH | Langenfeld, Germany |
| BYK-19 | Defoamer | BYK USA | Wallingford, CT |
| BYK-24 | Defoamer | BYK USA | Wallingford, CT |
| BYK 2010 | Defoamer | BYK USA | Wallingford, CT |

TABLE 1-continued

| Chemical | Function | Manufacturer | Location |
|---|---|---|---|
| CARBOTAC1811 | Tackifier | Lubrizol | Cleveland, OH |
| CITROFLEX 2 | plasticizer | Vertellus Specialties | Indianapolis, IN |
| CITROFLEX A4 | plasticizer | Vertellus Specialties | Indianapolis, IN |
| DUREFLEX PS8010 | polyurethane | Deerfield | South Deerfield, MA |
| DUREFLEX PT6100S | polyurethane | Deerfield | South Deerfield, MA |
| DUREFLEX PT9211S | polyurethane | Deerfield | South Deerfield, MA |
| EM 186217 | Polyurethane | Reichold Inc. | Research triangle park, NC |
| ENVIROGEM AE-03 | Surfactant | Air products & Chemicals | Allentown, PA |
| FORAL 85 | Hydrogenated rosin ester | Eastman | Kingport, TN |
| FT 1149 | PSA | Avery Dennison | Pasadena, CA |
| FT 1158 | PSA | Avery Dennison | Pasadena, CA |
| Print Gen MG | Slow drying agent | Matsui International | Gardena, CA |
| GME2397 | PSA | Cytec | Woodland park, NJ |
| GME2424 | PSA | Cytec | Woodland park, NJ |
| GME3011 | PSA | Cytec | Woodland park, NJ |
| GME3312 | PSA | Cytec | Woodland park, NJ |
| HARDOMER PE02 | Wax release | Byk USA | Wallingford, CT |
| HD 2101 | polyurethane emulsion | Hauthaway and Sons, company | Lynn, MA |
| HD 4669 | Polyurethane emulsion | Hauthaway and Sons, company | Lynn, MA |
| HFM PET | matte coated PET film | Hanse Corp. | Kyunggi, south Korea |
| GR B2 | Humectant | Lubrizol | Cleveland, OH |
| HYBRIDUR 870 | Polymer suspension | Air products & Chemicals | Allentown, PA |
| HYCAR 26084 | acrylic binder | Lubrizol | Cleveland, OH |
| Foral 85 | PSA | Eastman Company | Kingport, TN |
| KIWOPRINT D141 | PSA | Midwest Sign & Screen | Hayward, CA |
| KIWOPRINT D148 | PSA | Midwest Sign & Screen | Hayward, CA |
| KIWOPRINT D158 | PSA | Midwest Sign & Screen | Hayward, CA |
| L2985 | polyurethane emulsion | Hauthaway and Sons, company | Lynn, MA |
| LOPASIL | release liner | Loparex | Willowbrook, IL |
| MATSUMIN 301W | acrylic screen print ink, water based, white | Matsui International Co. | Gardena, CA |
| Neenah paper 97540P0 | Temporary support | Neenah Paper | Neenah, WI |
| PENCEL D-125 | rosin ester tackifier | Arakawa | Osaka, Japan |
| Polypropylene Laser toner transfer sheet | Temporary support | Neenah Paper | Neenah, WI |
| Polypropylene coated casting liner | Temporary support | Felix Schoeller North America | Pulaski, NY |
| PROHESION 3100 | PSA | Rohm and Haas Company | Philadelphia, Pa |
| PROHESION 3200 | PSA | Rohm and Haas Company | Philadelphia, Pa |
| PVP-SI | Release coating | ISP Technologies | Wayne, NJ |
| RA130W | release coating | Mayzo | Norcross, GA |
| RA-668W | release coating | Mayzo | Norcross, GA |
| RA-788W | release coating | Mayzo | Norcross, GA |
| RESPUMIT BA 2000 | Non-silicon defoamer | Tanatex Chemicals | Ede, Netherlands |
| Ropaque Ultra | opaque white polymer | Rohm and Haas Company | Philadelphia, Pa |
| SE-E-120WF | Tackifier | Arakawa | Osaka, Japan |
| S4.14 | Temporary support coating | NTP | Gaupe, Norway |
| SE-E-720WF | Tackifier | Arakawa | Osaka, Japan |
| SNOWTACK724G | Tackifier | Hexion Specialty Chemicals, Inc. | Columbus, OH |
| SNOWTACK765A | Tackifier | Hexion Specialty Chemicals, Inc. | Columbus, OH |
| SURFYNOL DF-37 | defoamer | Air Products & Chemicals | Allentown, PA |
| TAFIGEL PUR 61 | Thickener | Munzing | Bloomfield, NJ |
| Ti-Pure R-746 TiO2 | White Pigment | Dupont | Wilmington, DE |
| TiONA 595 | TiO2 slurry | Millennium Inorganic Chemicals | Hunt Valley, MD |
| Toluene | solvent | Aldrich | |
| Heptane | solvent | Aldrich | |
| Staybelite Ester 3 | Ester of Hydrogenated Rosin | Eastman | Kingsport, Tennessee |
| RC 7110 BHT AO | anti-oxidant | RheinChemie | Chardon, OH |
| Aroset 1085 | acrylic based polymer | Ashland | Columbus, OH |

Example 1 White Ink Formulation

This exemplary formulation contains L2985, Print Gen MG, GR B2, and Ti-Pure R-746 TiO2. The following procedure is used to create this ink formulation: Using a Caframo electric lab mixer, about 80 grams (g) of L-2985 is mixed with about 30 grams of Ti-Pure R-746 TiO2 for a few minutes. Then about 10 g of Print Gen MG is added and mixed using the mixer. Lastly, about 6 g of GRB2 is added and mixed for few minutes.

Example 2 White Ink Formulation 100 g of AQ white base is mixed with 3.5 g of AQ cross-linker first to create a paste with 7600 cps viscosity. 1.5 g of Borchi Gel L75N thickener is then added to the paste to create a white ink formulation with a viscosity of 17000 cps.

Examples 3 to 14

Examples 3 to 14 are additional examples of white ink formulation which are summarized in table 2. The ingredients are added in the same procedure as described in example 1.

TABLE 2

| Example No. | 3 | 4 | 5 | 6 | 7 | 8 | 9 | 10 | 11 | 12 | 13 | 14 |
|---|---|---|---|---|---|---|---|---|---|---|---|---|
| HYCAR 26084 (g) | 11 | | | | | | | | | | | |
| ROGAQUE Ultra (g) | 4 | | | | | | 2 | | | 1.5 | 15 | 2 |
| TioNA 595 (g) | 4 | | 40 | | 8 | 8 | 8 | 3 | | 8 | 5 | 3 |
| APR 202 (g) | 1 | 1 | 4 | 1.2 | | 0.2 | | | | 0.8 | | |
| L2985 (g) | | 75 | 60 | | | | | | | | | |
| Ti-Pure R-746 TiO2 (g) | | 25 | | | | | | | | | | |
| TAFIGEL PUR 61 (g) | | | 2 | | 0.4 | 0.4 | 0.2 | | | 0.4 | 0.4 | |
| MATSUMIN 301W (g) | | | | 30 | | | | | | | | |
| HD 2101 (g) | | | | | | | | 7 | 11 | 9.6 | | |
| HD4669 (g) | | | | | | | | | | | | 10 |
| EM 186217 (g) | | | | | 12 | 11.4 | 9.6 | | | | | |
| HYBRIDUR 870 (g) | | | | | | | | | | | 5 | 0.1 |
| ENVIROGEM AE-03 (g) | | | | | | | | | | | 0.1 | 0.1 |
| SURFYNOL DF-37 (g) | | | | | | | | | | | | 0.05 |
| BORCHIGEL (g) | | | | | | | | | 0.08 | | | 0.1 |

TABLE 3

| Example No. | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 |
|---|---|---|---|---|---|---|---|---|---|---|---|---|---|---|---|---|---|---|---|---|---|---|---|
| AE3413 | 6 | | | | | | | | | | | | | | | | | | | | | 7 | |
| SE-E-720WF | 4 | 2 | 2 | 2 | 2.5 | 2.5 | 2.5 | 2.5 | 9 | 9 | | | | 5 | 5 | | | | | | | | |
| KIWOPRINT D158 | | 4.2 | | | | | | | | | | | | | | | | | | | | | |
| KIWOPRINT D148 | | | 8 | | | | | | | | | | | | | | | | | | | | |
| KIWOPRINT D141 | | | | 8 | | | | | | | | | | | | | | | | | | | |
| GME2397 | | | | | 7.5 | | | | | | | | | | | | | | | | | | |
| GME2424 | | | | | | 7.5 | | | | | | | | | | | | | | | | | |
| GME3011 | | | | | | | 7.5 | | 21 | 21 | 21 | 21 | 19 | 7.3 | 9.6 | 7 | | 14 | 10 | | 17 | | 7 |
| GME3312 | | | | | | | | 7.5 | | | | | | | | | 21 | | 4 | | | | |
| TAFIGEL PUR61 | | | | | 0.2 | 0.2 | 0.2 | 0.2 | | | | | | 0.4 | 0.4 | 0.2 | | | | | 0.4 | | 0.2 |
| CITROFLEX A4 | | | | | | | | | | 1.2 | | | 1 | | 1 | | | | | | 2.6 | | |
| BYK 2010 | | | | | | | | | | 0.3 | 0.3 | | | | | | | | | | | | |
| BORCHI GEL | | | | | | | | | .24 | 0.3 | 0.3 | 0.3 | | | | 0.5 | 0.1 | 0.1 | 0.2 | | | | 0.1 |
| SNOWTACK 724G | | | | | | | | | | 9 | | | | | | | 3 | 2 | | | | | |
| SNOWTACK 765A | | | | | | | | | | | 9 | | | | | | | 3 | 4 | | | | |
| AIRFLEX 920 | | | | | | | | | | | | | | | | | | | | | | | |
| HARDOMER PE02 | | | | | | | | | | | | | 7.3 | | | | | | | | | | |
| L2985 | | | | | | | | | | | | | | 5 | | | | | | | | | |
| AQUATAC6025 | | | | | | | | | | | | | | 2 | 6 | | | | | | | 3 | 3 |
| CITROFLEX 2 | | | | | | | | | | | | | | | 3 | | | | | | | | |
| CARBOTAC 1811 | | | | | | | | | | | | | | | | | | | | | | 20 | |

Example 15 Pressure Sensitive Adhesive Example—Solvent Based PSA

I-814 is made with the following formulation by weight: toluene at 20.05%, Heptane at 6.01%, Foral 85 at 20.54%, Staybelite Ester 3 at 3.32%, RC 7110 BHT AO at 0.28%, and Aroset 1085 at 49.80%. The formulation is further modified as following to make the final PSA: about 80 g of I-814 and about 10 g CITROFLEX A4 are mixed with a mixer at high speed.

Example 16 PSA Example

About 70 g of CYTEC GME3011, about 30 g SNOWTACK 765A, about 2 g APR202, and about 0.8 g BORCHI Gel L75N are mixed with a mixer at medium speed.

Example 17 PSA Example

About 2400 grams of KIWOPRINT acrylic PSA D158, about 600 g of SE-E-720WF, about 36 g of BYK-19, about 24 g of BYK-24, about 90 g of RESPUMIT BA 2000, and about 30 g of BORCHI Gel L75N are mixed with medium speed mixer for a PSA with viscosity of 16500 cps.

Example 18

About 1095 g of GME 3011, about 375 g of SE-E-720WF, about 13.2 g of BYK-19, about 8.8 g of Byk-24, about 22 g of RESPUMIT BA 2000, and about 7 g of BORCHI Gel L75N are mixed with medium speed mixer for a PSA with viscosity of 19000 cps.

Examples 19 to 41

Examples 19 to 41 are additional examples of the pressure sensitive adhesive. Table 3 summarized the formulations. The ingredients are mixed in the similar procedure as described in the previous examples.

Adhesive from example 27, commercially available KIWOPRINT D-158, and FT 1149 are subject to wet and dry adhesion test respectively. For adhesive in example 27, the wet adhesion is 14.54 N/in in average and the dry adhesion is 17.92 N/in in average. For KIWOPRINT D-158, the wet adhesion is 0 N/in in average and the dry adhesion is 8.82 N/in in average. For FT 1149, the wet adhesion is 1.84 N/in in average and the dry adhesion is 12.74 N/in in average. When using preshrunk cotton of Hanes heavyweight white T-shirt in place of the red dyed 100% polyester fabric, adhesive from example 27 shows wet adhesion 9.95 N/in in average and the dry adhesion 16.38 N/in in average.

The rheology properties of some of the adhesives are summarized in Table 4.

TABLE 4

| Example # | G' @ 25 C dyne/cm^2 | G" @ 25 C dyne/cm^2 | max tan (delta) | Tg ° C. |
|---|---|---|---|---|
| 15 | 1.29E+05 | 1.01E+05 | 3.468 | −19.6 |
| 20 | 3.84E+05 | 3.10E+05 | 2.693 | −9.5 |
| 25 | 2.89E+05 | 1.81E+05 | 2.624 | −17.5 |
| 30 | 3.02E+05 | 2.13E+05 | 2.847 | −18 |
| 35 | 1.15E+05 | 5.92E+04 | 3.005 | −28.5 |
| 37 | 2.31E+05 | 1.56E+05 | 2.902 | −18.1 |
| 39 | 2.88E+05 | 1.80E+05 | 2.452 | −33 |
| 41 | 2.62E+05 | 1.67E+05 | 3.49 | −22.5 |

Example 42 Temporary Support

RA668W was coated on HFM PET at 20 gsm. The coating is dried at about 100° C. for about 10 minutes. Additional examples are listed in table 5.

TABLE 5

| Example No. | 43 | 44 | 45 | 46 | 47 | 48 | 49 | 50 | 51 |
|---|---|---|---|---|---|---|---|---|---|
| DI Water (g) | 10 | 10 | 10 | 10 | 10 | 10 | 5 | 15 | 20 |
| ENVIROGEM AE-03 (g) |  | 0.1 |  | 0.1 |  | 0.1 |  |  |  |
| PVP-SI (g) |  |  |  |  |  |  |  |  | 1 |
| RA-130W (g) | 1 | 1 |  |  |  |  |  | 1 | 1 |
| RA-13W (g) |  |  |  |  |  |  | 1 |  |  |
| RA-668W (g) |  |  |  |  | 1 | 1 |  |  |  |
| RA-788W (g) |  |  | 1 | 1 |  |  |  |  |  |

Example 43 a PSA Label with a Printable Media

An indicia is printed on Neenah paper 9754P0 using Laser toner printer OKI C3200n. Solvent-based FT 1158 coated on silicone release liner from Avery Dennison is then laminated with the Neenah paper on the side opposite to the toner printed side. The laminate is then cut around the printed image using a Roland plotter cutter. The cutting cuts through the Naanah Paper and the adhesive, but not through the silicone liner. The excess areas on the Neenah paper is removed to leave only the laser toner printed image on the silicon liner.

Example 44 PSA Label Created Using Screen Printing

The temporary support used was 105 microns thick Smartrans matt CGR polyester film from Hanse Corp. (Kyunggi, South Korea) coated with 54.14 release coating (NTP, Gaupe, Norway). White ink formulation from example 2 with a viscosity of 17000 cps was printed on the temporary support using a flatbed ATMA printer (ATMA Champ Ent Corp., Taipei, Taiwan) with 48 mesh screen for 2 passes to obtain 25 microns white pattern thickness. The printed ink was dried in drying tunnel at 105° C. for 60 sec. The same screen printer with a 48 mesh screen was used for printing the PSA formulation from example 17. A total of 6 passes was used for a 60 microns adhesive thickness. Drying was done in drying tunnel set at 105° C. for 60 sec. The printed transfer label sheets were cured for 6 hrs at 65° C. The total label transfer label thickness obtained was 190 um.

Example 45 a PSA Label Created Using Die Cutting

A digital toner image is printed on a polypropylene laser toner transfer sheet using an Oki C3200n laser toner printer. A polyurethane based printable media from example 1 is coated on this printed sheet at about 20 microns thickness. A PSA of example 15 with about 70 gsm coating weight on a silicone liner is then laminated to the polyurethane coated print sheet. The laminate is then cut around the toner image using a rotary die. The silicone release liner is peeled off the label to expose the pressure sensitive adhesive.

Example 46

Neenah paper 9754P0 is laminated with the PSA of example 15 after peeling off the carrier sheet on the newly exposed side. The label is marked with a permanent marker such as Sharpie or Mark-a-Lot (by Avery Dennison).

Example 47

About 2 mils of white formulation in example 4 is coated on PP release liner, and dried at about 90° C. for about 1 min. Then about 10 mils of PSA of example 17 is coated on top of white layer and dried at about 100° C. for about 3 hrs. The sample is then laminated with a silicon liner on top of the PSA. The sample is then die cut with the reversed image of N-shape die punch.

Example 48

This example uses white formulation of example 10, adhesive formulation of example 16, and temporary support formulation of example 46. The formulation of example 46 is coated on matte-coated HFM PET sheet with about 20 microns thickness and dried at about 100° C. for about 2 minutes to create the temporary support. The white ink and adhesive are coated using the same process and parameters as described in example 56.

Example 49

This example uses the white ink formulation of example 2, the adhesive formulation of example 18, and the same temporary support and process as example 53.

Each label from example 52 to 58 is placed on the Atletico Home FA10 polyester fabric with the following procedures. First, the silicon liner is peeled off to reveal the PSA layer. The label is then attached to a polyester fabric of about 4"×5" dimension. The sample is then placed under a press setup of about 80 psi for about 10 sec. Lastly, the temporary support is peeled off. The sample is conditioned at room temperature for 48 hours. The fabric with the label attached is then tested using the washing and drying method about 5 times. All examples show no visible change such as discoloration, wrinkling, or edge lift.

Example 50

This example uses HFM PET sheet coated with example 43 at 20 gsm as the temporary support, AQ white base with 4% APR 202 as a white ink layer at 25 micron thickness, and example 27 as the adhesive. A 1" by 8" strip of the label sample was cut and laminated on a stainless steel panel from Cheminstruments through the adhesive side with a 4" free end. The free end was attached to the jaws of the Instron 5542 for a 90 degree peel test at 12 inch per minute peel rate. An average peel force (F1) of 2.89 N/in was recorded for peeling the temporary support off the label. The same sample was laminated onto a stainless steel panel using double side tape through the HFM PET side. A silicone coated PET release was used to laminate on the adhesive side. The peel force (F3) was 0.07 N/in for peeling the silicone coated PET release liner off the adhesive side. This example illustrates that the adhesion of the PSA release to the PSA (F3) is smaller than that of the temporary release to the ink layer (F1). And that the adhesion force of temporary release to the ink layer (F1) is smaller than that of the adhesive to the final substrate (F2), even under wet condition, which is at least around 10 N/in.

All of the features disclosed in the specification, including the claims, abstract, and drawings, and all of the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. A cold transfer pressure sensitive label for labeling a fabric material, the pressure sensitive label comprising:
    a pressure sensitive adhesive with a first surface and a second surface and a release liner is disposed on the second surface of the pressure sensitive adhesive the pressure sensitive adhesive is one of a solvent-based polymer or an emulsion-based polymer, and includes between 5% to 50% by weight of a hydrogenated rosin ester based tackifier and,
    at least one printable film layer having a design and constructed out of soft and stretchable material disposed on the first surface of the pressure sensitive adhesive, the at least one printable film layer configured to stretch to the extent of the fabric material stretching and the pressure sensitive adhesive is in registration with the design;
    at least one ink layer disposed on the printable film layer;
    a removable support having an upper surface and a lower surface, and the lower surface is disposed on the at least one ink layer wherein the pressure sensitive adhesive has a wet adhesion greater than about 10 N/in such that a non-silicone pressure sensitive adhesive release material is coated over the upper surface of the removable support wherein the removable support with the release material is removed when the cold transfer pressure sensitive label is attached to a substrate such that only the at least one ink layer is attached to the substrate through the pressure sensitive adhesive and the surface energy of the lower surface of the removable support on the at least one ink layer is between 20 to 35 mN/m, and the label is transferable to the fabric material without heat and
    the pressure sensitive label is capable of remaining on the substrate through repeated washing and drying cycles.

2. The pressure sensitive label of claim 1, wherein the ink layer is selected from a group consisting of digital inks, dye inks, pigment inks, wax inks, UV inks, liquid toner inks, ink jet inks, laser toners, marker inks, analog inks, flexo inks, gravure inks, liquid inks, solid inks, thermography powders, screen printing inks, and combinations thereof.

3. The pressure sensitive label of claim 1, wherein the pressure sensitive adhesive is digital or analog printable.

4. The pressure sensitive label of claim 1, wherein the pressure sensitive adhesive label is self wound or stacked with the pressure sensitive adhesive in contact with the upper surface of the removable support.

5. The pressure sensitive label of claim 1, wherein the pressure sensitive adhesive is cross-linked.

6. The pressure sensitive label of claim 1, wherein the printable film layer is selected from the group consisting of polyurethane, EVA, PET, fabric, synthetic leather, suede, foam, specialty paper, polypropylene, polyethylene, polyolefin, inkjet printable media, toner printable media, pvc, non-pvc film, bamboo textiles, biodegradable polymer, PLA, woven, and nonwoven materials.

7. The pressure sensitive label of claim 1, further comprising a functional layer selected from the group consisting of RFID components, barcodes, identification components, indication components, sensing components, marking components, tracking components, temperature sensing components, and authentication components.

8. A cold transfer pressure sensitive label for labeling a substrate, the pressure sensitive label comprising:
- a pressure sensitive adhesive layer, the pressure sensitive adhesive layer is one of a solvent-based polymer or an emulsion-based polymer, and includes between 5% to 50% by weight of a hydrogenated rosin ester based tackifier;
- at least one elastomeric ink layer disposed on the pressure sensitive adhesive layer, the elastomeric ink comprises a polyacrylate and the at least one elastomeric ink layer is made up of multiple layers;
- a removable support disposed on the least one elastomeric ink layer on a surface opposite the pressure sensitive adhesive layer wherein the removable support has an upper surface and a lower surface such that the surface energy of the lower surface of the removable support on the at least one ink layer is between 20 to 35 mN/m and wherein a non-silicone pressure sensitive adhesive release material is coated over the upper surface of the removable support; and
- wherein the pressure sensitive adhesive is one of a solvent-based polymer, a tackified emulsion polymer, or UV curable and has a wet adhesion greater than about 10 N/in and the label is transferable to the substrate without heat and the substrate and the removable support is removed when the cold transfer pressure sensitive label is attached to a substrate such that only the at least one ink layer is attached to the substrate through the pressure sensitive adhesive, and an RFID tag is attached to the substrate through the adhesive layer and
- the pressure sensitive label is capable of remaining on the substrate through repeated washing and drying cycles.

9. The pressure sensitive label of claim 8, further comprising a release liner disposed on the pressure sensitive adhesive layer.

\* \* \* \* \*